United States Patent
Hermans (10) Patent No.: US 11,739,683 B2
(45) Date of Patent: Aug. 29, 2023

(54) METHOD FOR CONTROLLING A COMPRESSION RELEASE BRAKE MECHANISM IN A COMBUSTION ENGINE

(71) Applicant: DAF Trucks N.V., Eindhoven (NL)

(72) Inventor: Niek Laurentius Adrianus Hermans, Best (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 17/851,132

(22) Filed: Jun. 28, 2022

(65) Prior Publication Data

US 2023/0003166 A1    Jan. 5, 2023

(30) Foreign Application Priority Data

Jun. 30, 2021   (NL) ..................................... 2028589

(51) Int. Cl.
*F02B 37/22*    (2006.01)
*F02M 26/05*   (2016.01)
*F02B 37/24*    (2006.01)
*F02D 9/04*     (2006.01)
*F02D 9/06*     (2006.01)
(Continued)

(52) U.S. Cl.
CPC .............. *F02B 37/22* (2013.01); *F02B 37/24* (2013.01); *F02D 9/04* (2013.01); *F02D 9/06* (2013.01); *F02D 13/04* (2013.01); *F02D 41/0047* (2013.01); *F02M 26/05* (2016.02);
(Continued)

(58) Field of Classification Search
CPC .. F02B 37/22; F02B 37/24; F02D 9/04; F02D 13/04; F02D 41/0047; F02D 2200/024; F02D 2200/101; F02D 2200/703; F02M 26/05
See application file for complete search history.

(56) References Cited

U.S. PATENT DOCUMENTS

| 8,931,456 | B2 | 1/2015 | Rammer et al. |
| 2003/0014973 | A1* | 1/2003 | Mazaud .............. F02D 41/0007 60/602 |
| 2015/0144097 | A1 | 5/2015 | Lingens et al. |

FOREIGN PATENT DOCUMENTS

| EP | 1275833 A1 | 1/2003 |
| EP | 1389270 A1 | 2/2004 |

(Continued)

OTHER PUBLICATIONS

Dutch Search Report and Written Opinion—App No. 2028589—dated Mar. 14, 2022.

*Primary Examiner* — Audrey B. Walter
(74) *Attorney, Agent, or Firm* — Banner & Witcoff, Ltd.

(57) ABSTRACT

A method is disclosed for controlling a compression release brake mechanism in a combustion engine. The method comprises: determining a desired exhaust manifold gas pressure level; continuously monitoring a set of control parameters, including at least two of cylinder pressure, exhaust manifold pressure, turbine speed and turbine expansion ratio; controlling a brake pressure valve and a variable turbine geometry by said control parameters, to drive one of the control parameters to a set first maximum level; and, while maintaining the first of the set of control parameters at the set first maximum level, controlling an exhaust gas recirculation valve by said control parameters in a closed loop to allow exhaust gas to recirculate towards an air inlet system while driving a second of the set of control parameters to a set second maximum level.

17 Claims, 8 Drawing Sheets

(51) Int. Cl.
 _F02D 13/04_  (2006.01)
 _F02D 41/00_  (2006.01)
(52) U.S. Cl.
 CPC .. *F02D 2200/024* (2013.01); *F02D 2200/101* (2013.01); *F02D 2200/703* (2013.01)

(56) References Cited

FOREIGN PATENT DOCUMENTS

EP  2412955 A1  2/2012
WO  02095203 A1  11/2002

* cited by examiner

METHOD FOR CONTROLLING A COMPRESSION RELEASE BRAKE MECHANISM IN A COMBUSTION ENGINE

CROSS-REFERENCE TO RELATED APPLICATIONS

This application claims priority under 35 U.S.C. § 119 to Application NL 2028589, filed Jun. 30, 2021, which is hereby incorporated by reference in its entirety.

FIELD OF THE INVENTION

The invention relates to a method for controlling a compression release brake mechanism in a combustion engine, and, in particular, to a method and system for controlling a compression release brake mechanism in an internal combustion engine comprising a turbocharger with variable turbine geometry, a compression release brake controller for use in such system and a computer program product using such method.

BACKGROUND OF THE INVENTION

Engine braking is a concept known from e.g. EP1389270. During engine braking, exhaust valves may be selectively opened to convert, at least temporarily, a power producing internal combustion engine into a power absorbing air compressor. Thus an engine brake system controls a lift of the exhaust valves, e.g. by a hydraulic actuator. At the beginning of the compression stroke the exhaust valves are opened and high pressurized air from the exhaust manifold flows back into the cylinder which increases the initial pressure during compression; this process is called BGR (Back Gas Recirculation). Subsequently the exhaust valves close again to increase pressure during the second half of the compression stroke. Near the end of the compression stroke the exhaust valves are opened again dissipating the energy instead of returning it to the drivetrain as positive power during the power stroke; this process is called CR (Compression Release). This sequence of events can generate high amounts of retarding power.

In US2015144097A1 a control system is disclosed wherein a variable turbine geometry (VTG) type turbocharger is used for engine brake purposes. The resistance of the turbine and energy delivered by the turbine to the compressor can be controlled by adjusting the flow area of the intake of the turbine. When using such VTG, adjustment of the flow area may be achieved by rotating the turbine vanes in a certain position or transferring a sliding wall within the turbine to a certain position. Adjustment of the VTG has a direct effect on the pressure in the inlet and exhaust manifolds. The braking torque of a compression brake in an IC engine depends on the gas pressure in the inlet and exhaust manifolds so that the control of the flow area of the VTG provides the possibility to control the braking torque. In particular, varying the flow area of the VTG controls the braking torque.

A closed loop control adjusts the vane or sliding wall, position of the turbine such that for a particular set of engine parameters, maximum braking torque can be achieved.

For known engine brake control systems however it is difficult to maintain maximum braking torque at high motor speeds and/or at high altitudes, reason why engine braking is engineered in control loops that cannot fully utilize the braking capacity.

Hence, there is a need in the art for improved method and systems for controlling engine braking of an engine comprising a variable turbine geometry turbocharger in order to provide improved braking capability while observing engine hardware limitations.

It is an object of the present invention to further advance the field of engine braking to address these and other challenges.

SUMMARY OF THE INVENTION

The invention concerns a method for controlling a compression release brake mechanism in a combustion engine comprising an air inlet system and an exhaust manifold connected to a turbocharger provided with a variable turbine geometry (VTG) turbine, said exhaust manifold further comprising an exhaust gas recirculation (EGR) channel for recirculation of exhaust gas towards the air inlet system, wherein said turbine is further connected to a back pressure valve (BPV) provided in an exhaust channel, the method comprising

- determining a desired exhaust manifold gas pressure level on the basis of a measured engine speed and a desired braking torque;
- continuously monitoring a set of control parameters, including at least two of cylinder pressure, exhaust manifold pressure, turbine speed and turbine expansion ratio;
- controlling said BPV and said VTG by said control parameters, to drive one of the control parameters to a set maximum level; and
- controlling the EGR by said control parameters in a closed loop to allow exhaust gas to recirculate towards the air inlet system while driving a second of the set of control parameters to a set maximum level.

The invention has an advantage that the exhaust manifold gas pressure can be controlled by the EGR valve in an additional air path towards the air inlet via the EGR. The engine brake performance can thus be optimized to at least two hardware limitations of a set of control parameters, including cylinder pressure, exhaust manifold pressure, turbine speed and turbine expansion ratio, to optimize braking capability while keeping said limitations within predetermined maximum hardware constraints. The control parameters may be suitably derived from other control parameters and a model. This results in increased engine brake performance, and/or a lower load on the VTG turbine. Furthermore, by increasing the amount of inlet pressure via this additional air path, altitude performance can be increase.

BRIEF DESCRIPTIONS OF THE DRAWINGS

The invention will be further elucidated in the figures:

FIG. 3(A-D) shows a number of typical control parameter values as a function of engine speed;

FIG. 4(A-H) shows non-limiting exemplary qualitative behavior of a compression release brake mechanism that is controlled in a range 0-20% of the EGR valve opening

DETAILED DESCRIPTION

Aspects of the invention pertain to a method for controlling a compression release brake mechanism in a combustion engine comprising an air inlet system and an exhaust manifold connected to a turbocharger provided with a variable turbine geometry (VTG) turbine, said exhaust manifold further comprising an exhaust gas recirculation (EGR) channel for recirculation of exhaust gas towards the air inlet system, wherein said turbine is further connected to a back pressure valve (BPV) provided in an exhaust channel. The method comprises
- determining a desired exhaust manifold gas pressure level on the basis of a measured engine speed and a desired braking torque;
- continuously monitoring a set of control parameters, including at least two of: cylinder pressure, exhaust manifold pressure, turbine speed and turbine expansion ratio;
- controlling said BPV and said VTG by said control parameters, to drive a first of the set of control parameters to a set maximum level; and
- controlling the EGR valve by said control parameters in a closed loop to allow exhaust gas to recirculate towards the air inlet system while driving a second of the set of control parameters to a set maximum level.

The EGR valve may be controlled, at least partly in time, continuously to drive the second of the set of control parameters to a set maximum level, until for a third of the set of control parameters a maximum set value is reached.

An EGR valve position may be controlled in open loop when a turbocharger speed falls below a preset level.

The turbine speed may controlled in a closed loop fashion as the first of the control parameters, wherein the exhaust back pressure is provided as the second of the control parameters.

The desired exhaust manifold gas pressure may be determined on the basis of an exhaust manifold gas pressure function p exh=f(n,P s); preferably said predetermined exhaust manifold gas pressure function being implemented as a look-up table in a memory comprising exhaust manifold gas pressure values stored as a function of at least the engine speed and braking torque.

The desired exhaust manifold gas pressure may be a function dependent on ambient air pressure p exh=f(n,p a,P s) or air inlet manifold pressure p exh=f(n,p i,P s).

The back pressure valve may be controlled using a predetermined back pressure valve function for determining position information of said back pressure valve as a function of at least said engine speed and said desired braking torque Y BPV=f(n,P s); preferably said predetermined back pressure valve function being implemented as a look-up table in a memory comprising back pressure valve position values stored as a function of at least engine speed and braking torque.

The back pressure function may be further dependent on ambient air pressure Y BPV=f(n,p a,P s) or the air inlet manifold pressure Y BPV=f(n,p i,P s).

Controlling said variable turbine geometry may comprises: receiving a desired exhaust manifold gas pressure;
- determining a desired variable turbine geometry using said desired exhaust manifold gas pressure and said measured exhaust manifold gas pressure;
- sending a control signal associated with said desired variable turbine geometry to one or more actuators for configuring said turbine into said desired variable turbine geometry.

Controlling said back pressure valve may comprise:
- determining a back pressure valve position;
- sending a control signal associated with said back pressure valve position to at least one actuator for configuring said back pressure value into said back pressure valve position.

Controlling said variable turbine geometry may comprise actuating one or more rotatable vanes of a variable geometry turbine; and/or, a sliding wall within the turbine.

A request for a desired braking torque may be received by an engine control unit.

Further aspects pertain to a compression release brake controller in an engine, comprising an exhaust manifold connected to a turbine provided with a variable turbine geometry wherein said turbine is further connected to a back pressure valve for controlling the pressure drop over said turbine. The compression release brake controller may be configured for
- determining a desired exhaust manifold gas pressure level on the basis of a measured engine speed and a desired braking torque;
- continuously monitoring a set of control parameters, including at least two of cylinder pressure, exhaust manifold pressure, turbine speed and turbine expansion ratio;
- controlling said BPV and said VTG by said control parameters, to drive one of the control parameters to a set maximum level; and
- controlling the EGR by said control parameters in a closed loop to allow exhaust gas to recirculate towards the air inlet system while driving a second of the set of control parameters to a set maximum level.

Further aspects pertain to a combustion engine comprising an air inlet system and an exhaust manifold connected to a turbocharger provided with a variable turbine geometry (VTG) turbine, said exhaust manifold further comprising an exhaust gas recirculation (EGR) channel for recirculation of exhaust gas towards the air inlet system, wherein said turbine is further connected to a back pressure valve (BPV) provided in an exhaust channel; said engine further comprising
means for monitoring control parameters, including at least two of cylinder pressure, exhaust manifold pressure, turbine speed and turbine expansion ratio; and a compression release brake controller as disclosed herewith.

Further aspects pertain to a computer program product, implemented on computer-readable non-transitory storage medium, the computer program product configured for, when run on a computer, executing the method steps as disclosed herewith.

Another aspect of the invention pertains to a truck, provided with a combustion engine controlled according to any of the described embodiments.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
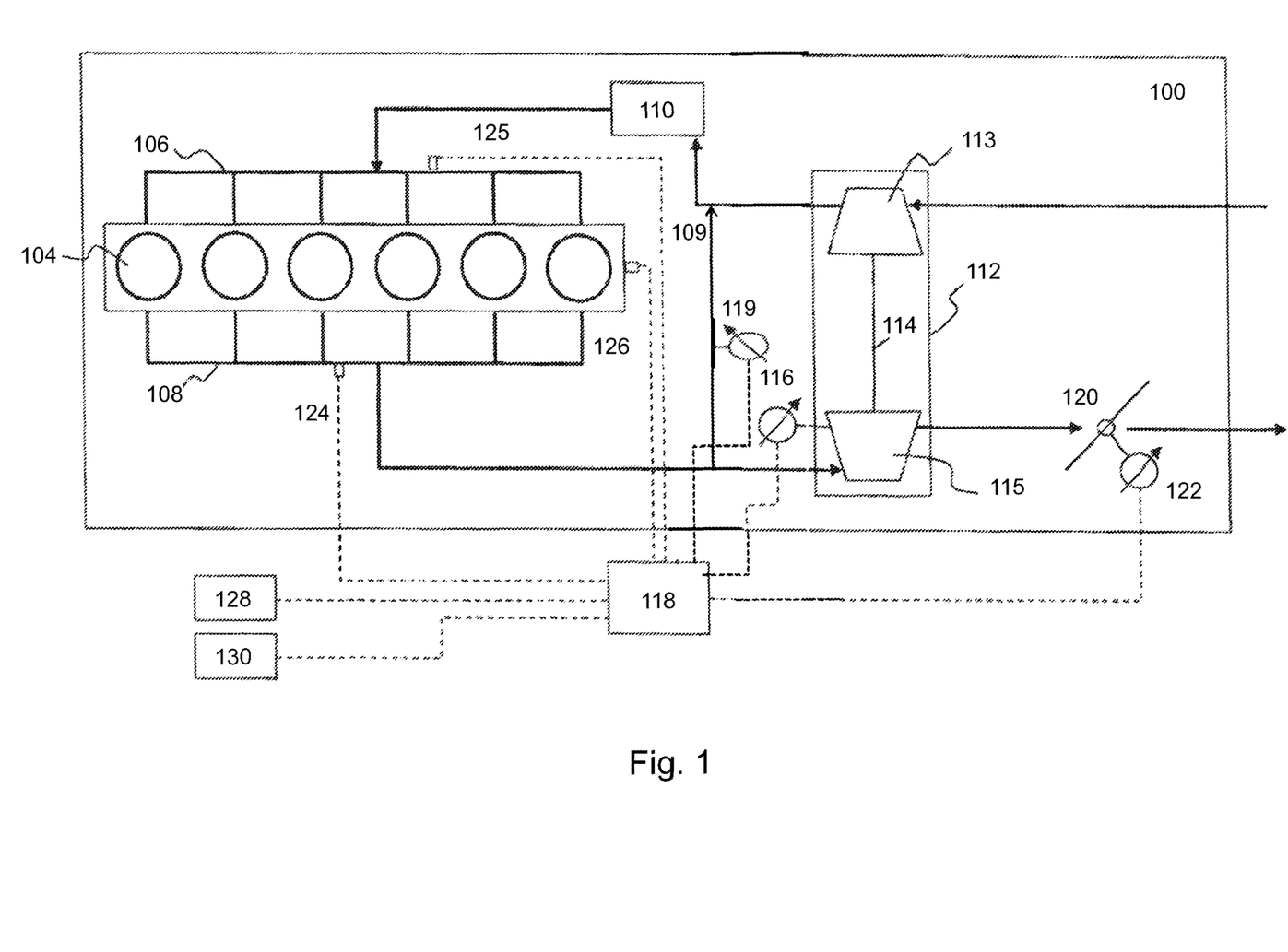
FIG. 1 provides a combustion engine and basic control scheme of EGR, VTG and BTV.

Turning to FIG. 1, there is shown a combustion engine 100 of a conventional design. The combustion engine has following features: an air inlet system 106 and an exhaust manifold 108 is provided for the cylinder section 104. A turbocharger 112, including a variable turbine geometry (VTG) turbine 115 is provided, that powers compressor 113, e.g. via a shaft 114. The exhaust manifold 108 further comprising an exhaust gas recirculation (EGR) channel 109 for recirculation of exhaust gas towards the air inlet system 106, wherein said turbine 115 is further connected to a back pressure valve 120 (BPV) provided in an exhaust channel. Turbo cooler 110, inlet pressure sensor 125, outlet pressure sensor 124, VTG actuator 116 and BPV actuator 122 and engine speed sensor 126 are illustrated. It is noted that the engine brake release mechanism is not explained in detail since it is deemed known to the skilled person and can be extracted from e.g. EP1389270 and US2015144097A1, incorporated by reference.

A typical control by ECU 118 can be as follows: a desired exhaust manifold gas pressure level is determined on the basis of a measured engine speed and a desired braking torque demand 130. Such desired values are in practice set or actively controlled in accordance with a maximum acceptable cylinder pressure, or any other limiting hardware constraint. In order to control the exhaust manifold gas pressure level, a number of control parameters is continuously monitored, including at least two of cylinder pressure, exhaust manifold pressure, turbine speed and turbine expansion ratio. It is noted that these control parameters may not be measured directly, but may also be monitored indirectly, e.g. by calibrating a suitable model and using said model to determine said control parameters in a per se known manner, e.g. via a lookup table. For example, the turbine expansion ratio may be measured by an ambient pressure sensor 128 and an outlet pressure sensor, or may be derived from a turbine model.

Furthermore, in the embodiment, the BPV 120 and VTG 115 are controlled by said control parameters, to provide said desired exhaust gas pressure level based on a comparison of at least a measured and desired exhaust manifold gas pressure level, wherein the BPV valve 120 is controlled to a maximum expansion ratio of the VTG 115. It is noted that in this specific control scheme the continuously variable control is performed via the VTG 115 in a closed loop, while BPV 120 and EGR 109 are controlled in open loop, wherein it is preferable that the VTG 115 operates at high speed, to optimize the in-cylinder trapped mass by increased function of compressor 113. During engine braking with a compression release brake mechanism, without further precautions, there is a risk that the turbo speed increases above the turbo speed limit. As a consequence the pre turbine pressure cannot be increased further which limits the braking torque. To avoid this torque limitation the BPV 120 can be closed to a certain extent to reduce the pressure drop (expansion ratio) over the turbine reducing the turbo speed. This provides the opportunity to close the VTG 115 further which increases pre turbine pressure (P3).

In a prior art control mode, to reduce the possible braking torque of the compression release brake mechanism with an already fully opened VTG 115, the EGR channel 109 can be opened to as a protection measure in case the pre turbine pressure becomes too high. While in such control mode the EGR valve actuator 119 opens EGR channel 109, it merely opens as a safety precaution in case certain threshold conditions are met and the VTG 115 meets a hardware limitation, notably, an excess turbine speed.

In a prior art control method, as at least two of these control parameters for controlling the braking torque, including cylinder pressure, exhaust manifold pressure, turbine speed and turbine expansion ratio, are controlled by a single back pressure valve actuator, where the most dominant variable will 'overrule' the others. This results in a situation where only one of the variables can reach a maximum allowed condition.

Figure 2:
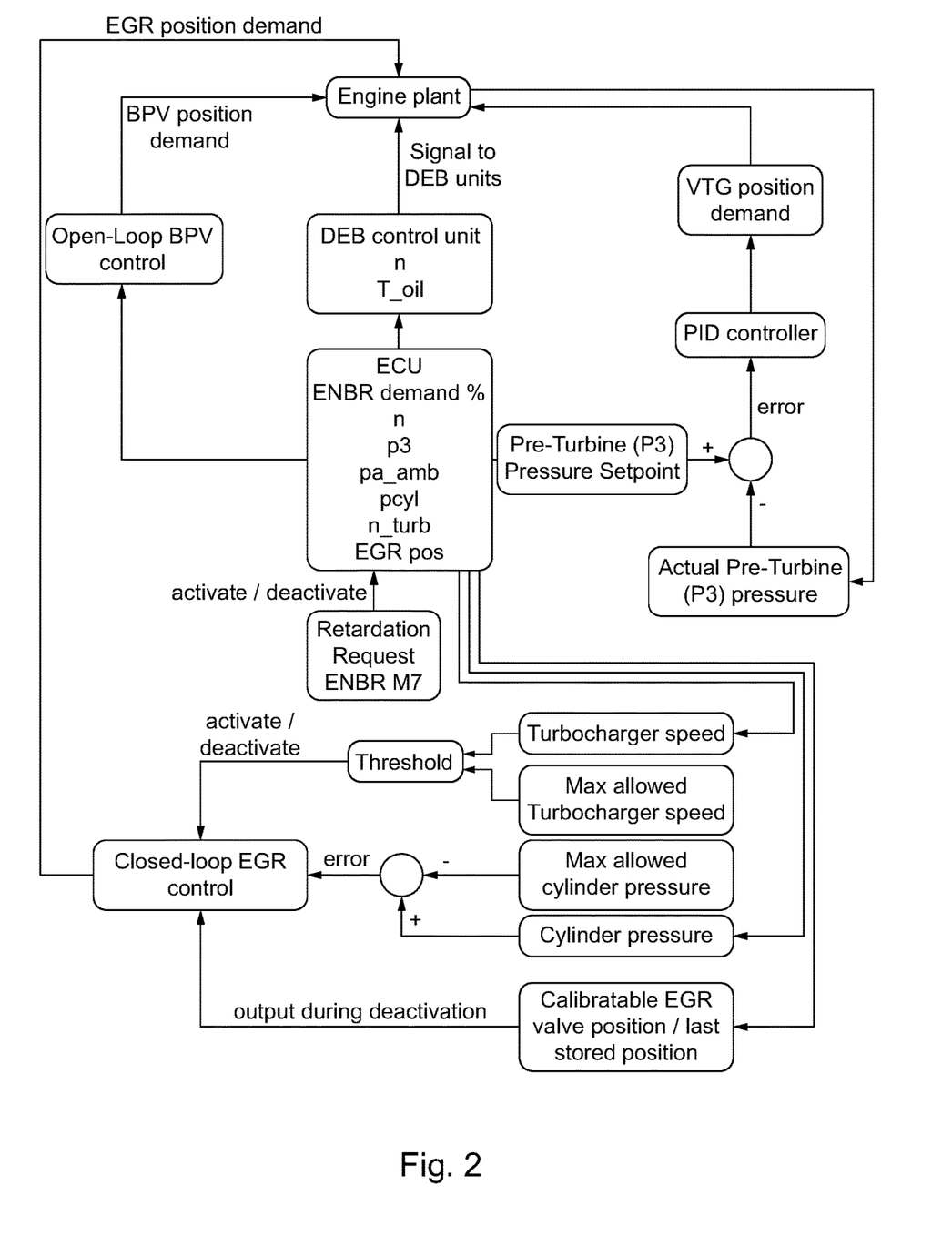
FIG. 2 provides a control scheme according to an embodiment of the invention.

Now turning to FIG. 2, a modified control scheme is presented according to an aspect of the invention. In this scheme an EGR control is provided wherein an EGR valve is at least partly in time continuously controlled in a closed loop to allow exhaust gas to recirculate towards the air inlet system while targeting a predetermined cylinder pressure, that may be controlled to reach a maximum set level, in accordance with an engine hardware specification. In this embodiment a first control parameter may therefore be the setting of the pre-turbine pressure, which calls for a continuous control of the VTG. A second control parameter may be the cylinder pressure, which calls for continuous control of the EGR valve. In this control scheme, the BPV may be open-loop or closed loop controlled.

Thus, the EGR control may be arranged to be controlled continuously to a maximum allowed cylinder pressure. In the control scheme, it is checked whether the turbocharger speed may remain at a set maximum allowed speed, which is preferential to maximize a mass stream of intake air into the cylinder. However, with increasing EGR valve opening, the amount of flow through the VTG will reduce eventually, after which the EGR valve may be kept in the current open position and is not further opened. It is noted, that the cylinder pressure may be measured directly, but can also be derived from a model, based on the exhaust and/or intake manifold gas pressure level and/or corresponding temperatures, turbocharge pressure, delta pressure over the intake air filter, egr outlet temperature, delta pressure over the egr, compressor load/speed or combinations thereof. Thus, the control parameters for controlling the braking torque, notably, the cylinder pressure may be suitably derived from other control parameters and a model, which can be varied by many variations known to the skilled person.

Additional to the closed loop control to obtain a maximum allowed cylinder pressure, a threshold control may be implemented that takes over the EGR control in case a maximum allowed turbocharger speed is reached. In that case, the EGR valve is no longer closed but may remain in an open position, e.g. a last stored position, or a position that is derived from a calibration table. Thus, while the EGR is controlled in a closed-loop control, when a threshold is reached for one of the set of control parameters, including at least one of cylinder pressure, exhaust manifold pressure, turbine speed and turbine expansion ratio, the closed-loop control may switch to open loop control.

Notably, while the shown embodiment of FIG. 2 provides improved engine brake capability by maximizing the cylinder pressure, improved engine brake capability may also be provided by another suitable choice of a control parameter, e.g. to optimize to a maximum turbocharger speed, and limit the speed in case a maximum cylinder pressure is reached. It is shown that the engine brake capability is thus optimized to at least two hardware limitations of a set of control parameters, including cylinder pressure, exhaust manifold pressure, turbine speed and turbine expansion ratio, to optimize braking capability while keeping said limitations within predetermined maximum hardware constraints.

Figure 3:
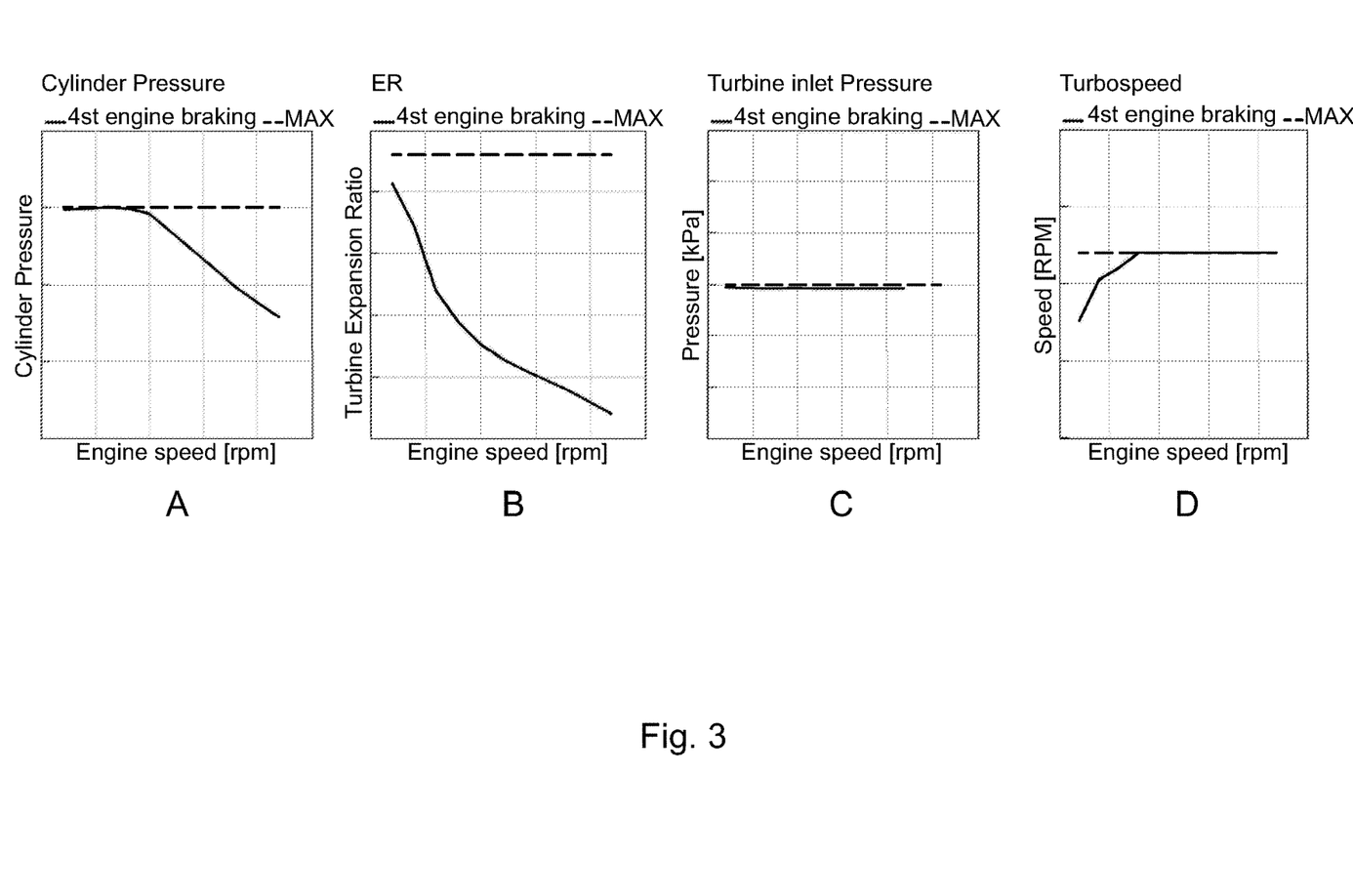

In more detail, FIG. 3 shows a typical behavior of hardware limitations during engine braking. The engine brake performance according to the invention can be optimized to at least two hardware limitations of a set of control parameters, including cylinder pressure (3A), turbine expansion ratio (3B), exhaust manifold pressure (3C), and turbine speed (3D), to optimize braking capability while keeping said limitations within predetermined maximum hardware constraints. The cylinder pressure may be measured directly or derived from inlet pressure and outlet pressure sensors and/or a corresponding model that predicts these values. The exhaust manifold pressure may be a suitable control parameter to provide a set maximum cylinder pressure, while turbine expansion ratio and turbine speed are kept within hardware limits. However, in an alternative control scheme, another one of the control parameters may be a suitable control parameter for providing a set parameter value of another control parameter. The turbine expansion ratio may be derived from ambient pressure sensor and an exhaust manifold sensor. The turbine inlet pressure may be measured by an exhaust manifold sensor. The turbospeed may be measured directly, or derived from a turbine map that correlates speed and pressure over the turbine. The control parameters may thus be suitably derived from other control parameters and a model as explained hereabove.

Figure 4:
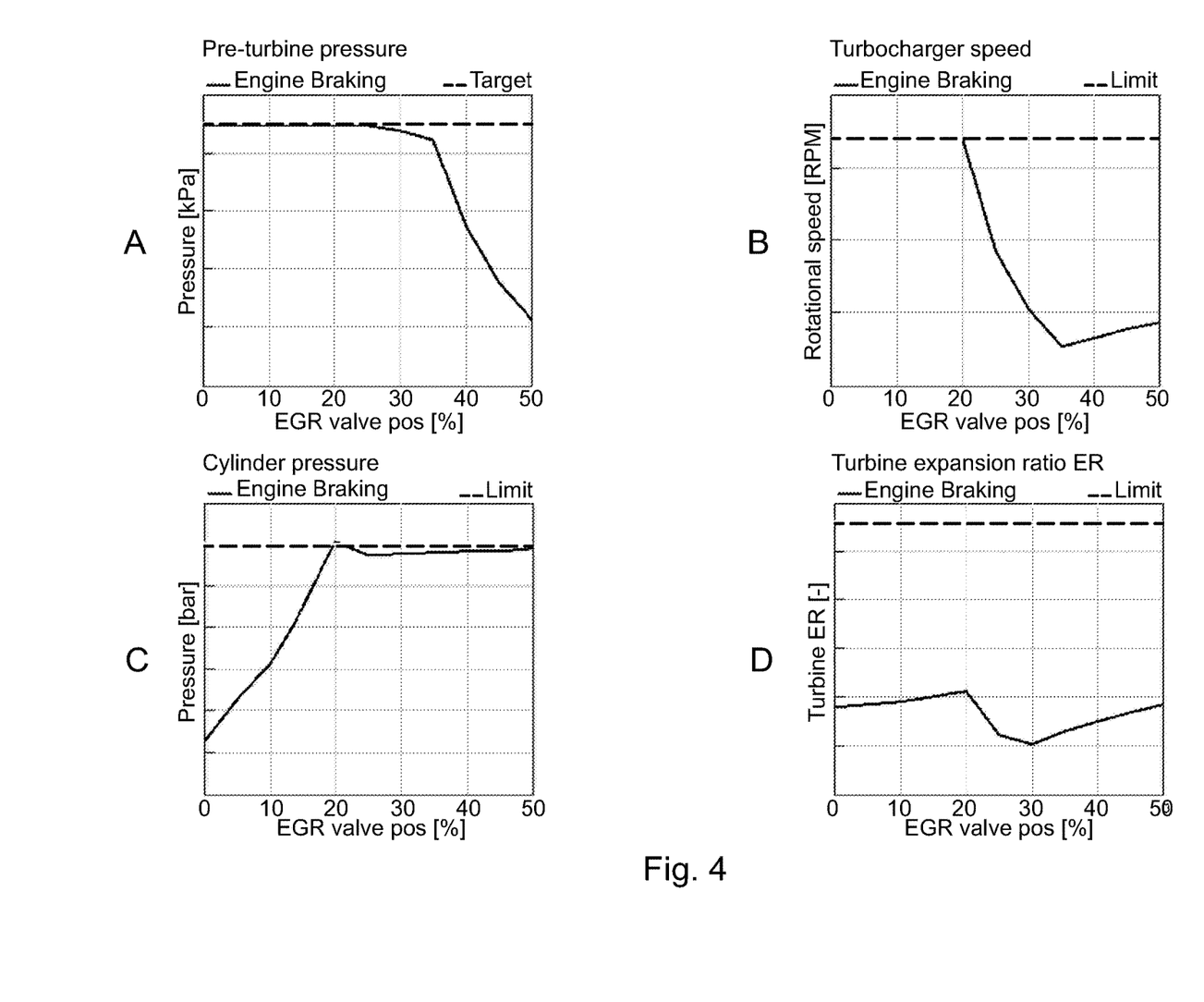

FIG. 4 shows non-limiting exemplary qualitative behavior of a compression release brake mechanism that is controlled, in part by a continuously variable EGR valve in particular, in a range 0-20% of the EGR valve opening.

Pre-turbine pressure (FIG. 4a): Pre-turbine pressure (P3) may be controlled via variable VGT position control. When opening the EGR valve mass flow through the VGT will reduce, VGT may be controlled to a more closed position to compensate for the flow reduction and maintain target P3.

Turbocharger speed (FIG. 4B): Turbocharger speed may be limited to a design limit by closing the BPV and reduce ER. When the EGR valve opens the mass flow through the turbine will effectively reduce. However, with increasing flow directed though the EGR channel the turbine speed may drop below the maximum. In the area of 0-20% EGR valve opening the BPV may slightly open to keep the turbospeed maximum.

Cylinder Pressure (FIG. 4C): Due to the turbocharger speed limit the cylinder pressure is below limit. When the EGR valve opens the total mass flow (fresh+EGR) towards the cylinder increases (see plot total mass trapped) and increases the cylinder pressure towards the limit. When the cylinder pressure limit is reached the BPV is closing rapidly to reduce pressure which impact braking torque.

Turbine Expansion ratio (FIG. 4D): The turbine expansion ratio (ER) may be impacted but will normally not reach a limit value at engine speeds in an area where the EGR valve may be dominant.

It is shown, that by suitable control of the EGR valve opening position in a range between 0 and 35%, more particular, 0-20, the turbo charger speed can be kept to a maximum set pressure level, while the cylinder pressure is also at a maximum level.

Engine Brake Power (FIG. 4E): (shown as negative torque) Brake power increases (becomes more negative) when the total trapped mass increases. When the EGR valve is opened further (in this case >20%) the trapped mass stays equal but the intake manifold conditions become less efficient and brake power drops again.

Compressor flow (FIG. 4F): Compressor flow is a result of the turbocharge speed (and PR of compressor). When the turbospeed drops due to increased opening of the EGR valve a 'fresh' intake air flow of the compressor will reduce and be replaced by less efficient 'hot' EGR flow (see FIG. 4G). Normally the turbospeed may be controlled via the BPV, but from 20% EGR valve onwards the cylinder pressure can be controlled via the BPV and therefore the compressor flow reduces.

EGR mass flow (FIG. 4G): With increased EGR valve opening the mass flow will increase.

Total mass trapped at IVC (FIG. 4H) This is the mass flow that effectively reaches the cylinders and will result in brake power. This is the 'sum' of the 'fresh' compressor mass flow and the 'hot' EGR mass flow.

Figure 5:
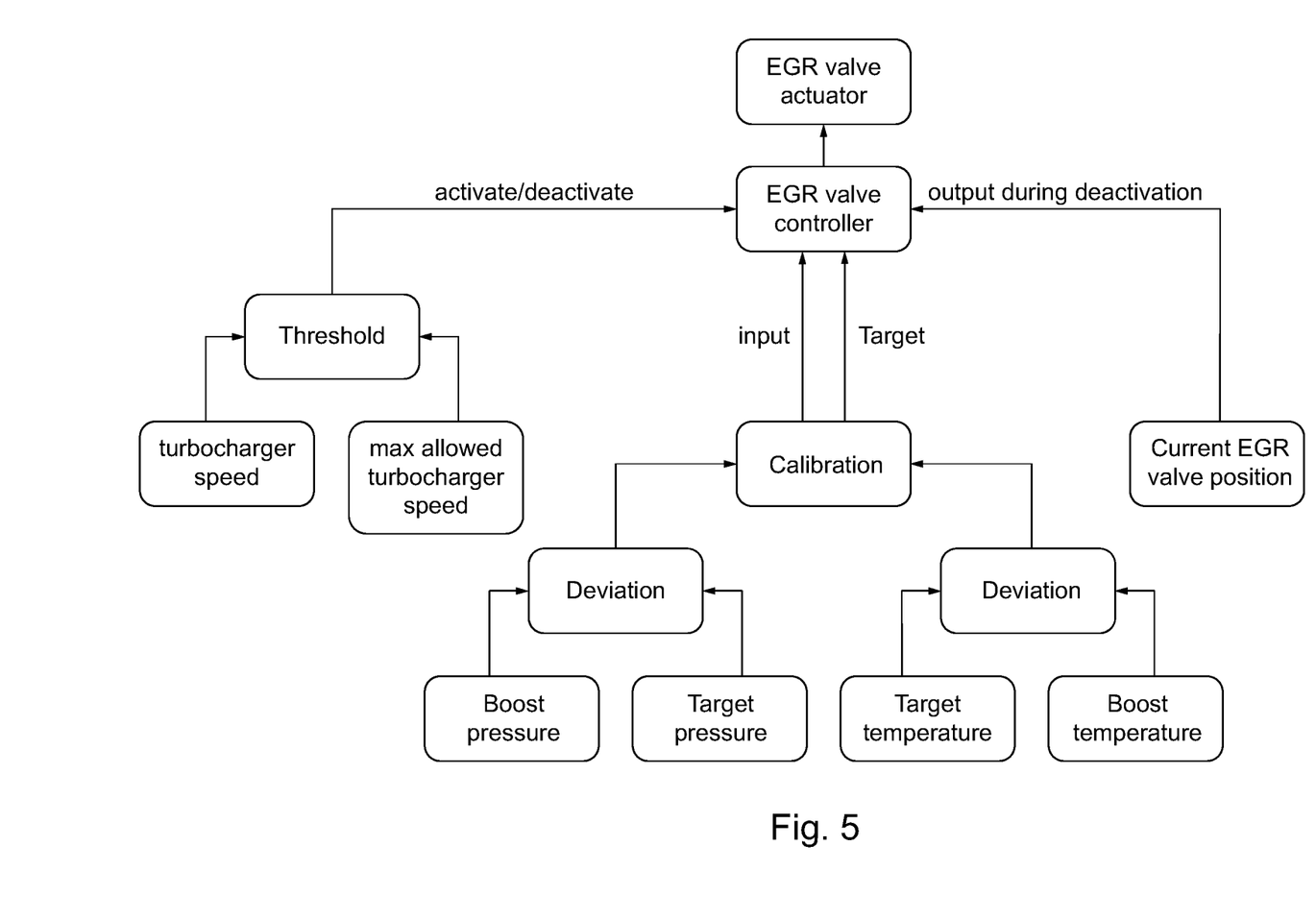
FIG. 5 shows a further exemplary embodiment wherein an EGR valve is controlled in closed loop to provide a desired braking torque.

In FIG. 5 a further exemplary embodiment is shown, where the EGR is controlled in a closed loop to allow exhaust gas to recirculate towards the air inlet system while driving a control parameter to a set maximum level. In this example also, closed loop control may be terminated when a turbocharger speed drops below a set speed value, which is preferably kept as high as possible, in particular close to a maximum allowed turbocharger speed. In such case a current EGR valve position may be maintained or at least will not be further opened. In the closed loop control of the EGR a target may be to control on target boost pressure level, and open the valve to increase the boost pressure. The boost pressure level may be temperature dependent, and may correlate via a calibration map, wherein a predetermined calibration map is provided that provides optimal settings for temperature and pressure values.

Figure 6:
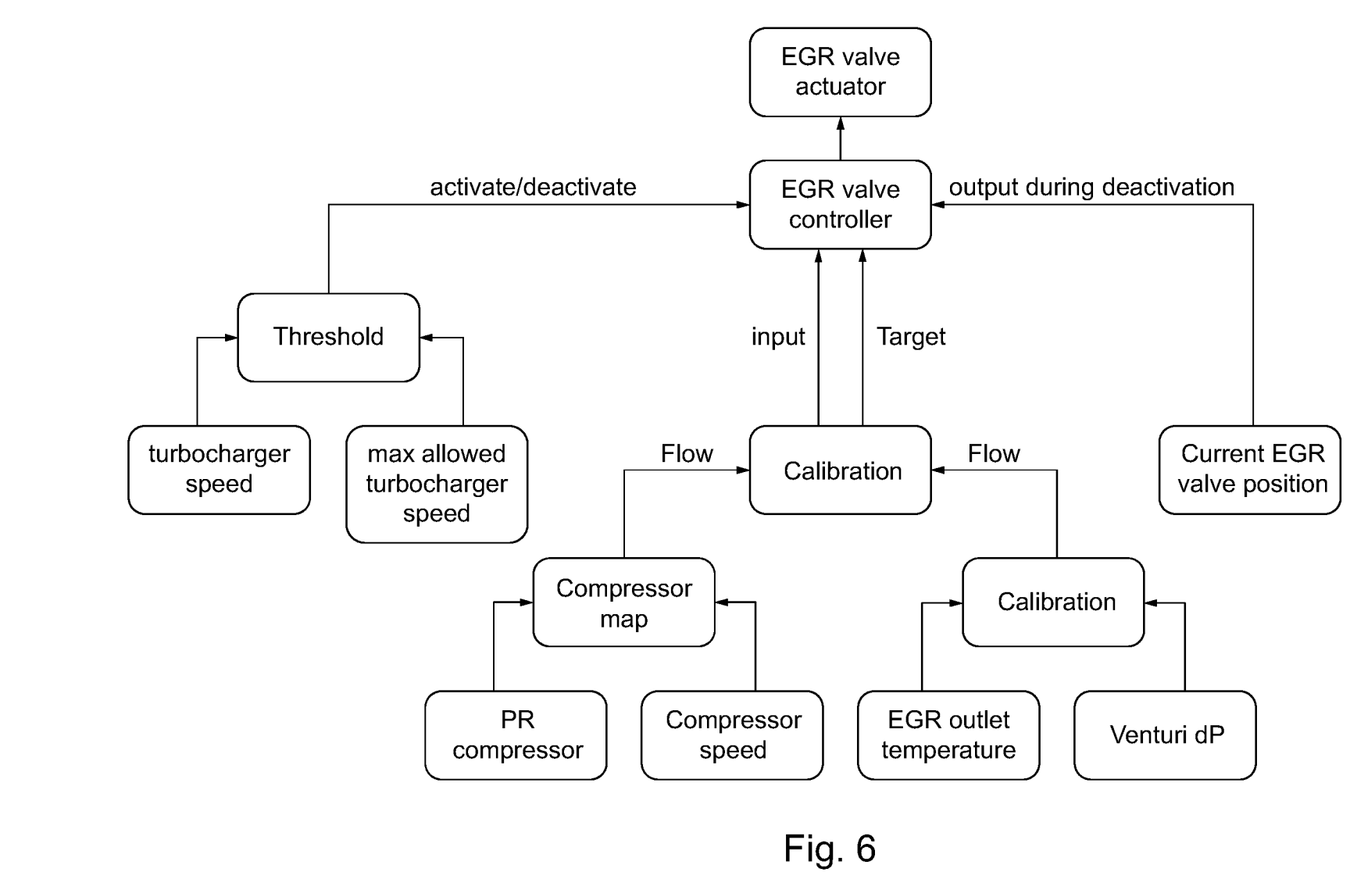
FIG. 6 shows another exemplary embodiment wherein an EGR valve is controlled in closed loop to provide a desired braking torque.

In FIG. 6 a still further exemplary embodiment is shown, where the EGR is controlled in a closed loop to allow exhaust gas to recirculate towards the air inlet system. In contrast to FIG. 5, as control variables can also be used a pressure ratio PR over the compressor, together with the compressor speed and a delta pressure (e.g. measured in a venturi duct) over the EGR and corresponding EGR outlet temperature.

Figure 7:
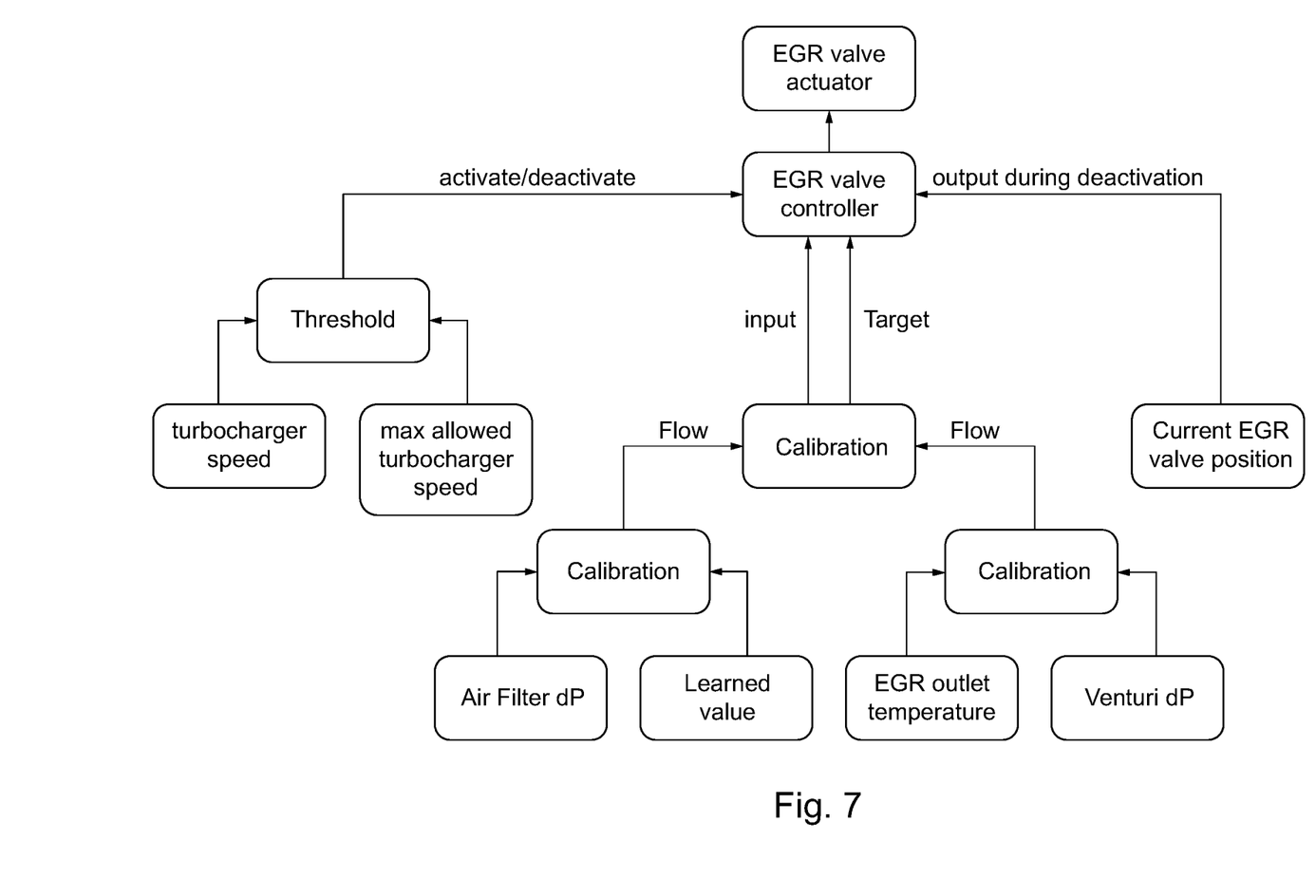
FIG. 7 shows still another exemplary embodiment wherein an EGR valve is controlled in closed loop to provide a desired braking torque.

In FIG. 7 a still further exemplary embodiment is shown, where the EGR is controlled in a closed loop to allow exhaust gas to recirculate towards the air inlet system. Here a set exhaust pressure level and boost pressure level may be derived from a pressure difference over the air filter that is measured or monitored and determines an input flow of air. This can be further adjusted by an EGR delta pressure, together with an EGR cooler outlet temperature.

One embodiment of the disclosure may be implemented as a program product for use with a computer system. The program(s) of the program product define functions of the embodiments (including the methods described herein) and can be contained on a variety of computer-readable storage media. The computer-readable storage media can be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored. It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. The invention applies not only to automotive applications where the combustion motor is used for traction power, but also to other industrial applications where an electric motor is used. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A method for controlling a compression release brake mechanism in a combustion engine comprising an air inlet system and an exhaust manifold connected to a turbocharger provided with a variable turbine geometry (VTG) turbine, said exhaust manifold further comprising an exhaust gas recirculation (EGR) channel for recirculation of exhaust gas towards the air inlet system, wherein said turbine is further connected to a back pressure valve (BPV) provided in an exhaust channel, the method comprising:
    determining a desired exhaust manifold gas pressure level on the basis of a measured engine speed and a desired braking torque;
    continuously monitoring a set of control parameters, including at least two of: cylinder pressure, exhaust manifold pressure, turbine speed and turbine expansion ratio;
    controlling said BPV and said VTG by said control parameters, to drive a first of the set of control parameters to a set first maximum level; and
    while maintaining the first of the set of control parameters at the set first maximum level, controlling an EGR valve by said control parameters in a closed loop to allow exhaust gas to recirculate towards the air inlet system while driving a second of the set of control parameters to a set second maximum level.

2. The method according to claim 1, wherein said EGR valve is controlled continuously to drive the second of the set of control parameters to the set second maximum level, until for a third of the set of control parameters a set third maximum level is reached.

3. The method according to claim 1, wherein an EGR valve position is controlled in open loop in response to a turbocharger speed falling below a preset level.

4. The method according to claim 1, wherein said turbine speed is controlled in a closed loop fashion as the first of the control parameters, wherein the exhaust manifold pressure is provided as the second of the control parameters.

5. The method according to claim 1, wherein said desired exhaust manifold gas pressure is a function dependent on ambient air pressure $p_{exh}=f(n, p_a, P_s)$ or air inlet manifold pressure $p_{exh}=f(n, p_i, P_s)$, wherein $p_{exh}$ is the exhaust manifold gas pressure, n is the engine speed, $p_a$ is the ambient air pressure, $p_i$ is the air inlet manifold pressure, and $P_s$ is the braking torque.

6. The method according to claim 1, wherein controlling said variable turbine geometry comprises:
    receiving the desired exhaust manifold gas pressure level;
    determining a desired variable turbine geometry using said desired exhaust manifold gas pressure and a measured exhaust manifold gas pressure;
    sending a control signal associated with said desired variable turbine geometry to one or more actuators for configuring said turbine into said desired variable turbine geometry.

7. The method according to claim 1, wherein controlling said back pressure valve comprises:
    determining a back pressure valve position;
    sending a control signal associated with said back pressure valve position to at least one actuator for configuring said back pressure valve into said back pressure valve position.

8. The method according to claim 1, wherein controlling said variable turbine geometry comprises actuating one or more rotatable vanes of the VTG turbine; and/or, a sliding wall within the turbine.

9. The method according to claim 1 further comprising: receiving a request for a desired braking torque.

10. The method according to claim 1, wherein said desired exhaust manifold gas pressure is determined on the basis of an exhaust manifold gas pressure function $p_{exh}=f(n, P_s)$, wherein $p_{exh}$ is the exhaust manifold gas pressure, n is the engine speed, and $P_s$ is the braking tongue.

11. The method according to claim 10, wherein said exhaust manifold gas pressure function is implemented as a look-up table in a memory comprising exhaust manifold gas pressure values stored as a function of at least the engine speed and braking torque.

12. The method according to claim 1, wherein said back pressure valve is controlled using a predetermined back pressure valve function for determining position information of said back pressure valve as a function of at least said engine speed and said desired braking torque $Y_{BPV}=f(n, P_s)$, wherein $Y_{BPV}$ is the position information of the back pressure valve, n is the engine speed, and $P_s$ is the braking torque.

13. The method according to claim 12, wherein said back pressure valve function is further dependent on ambient air pressure $Y_{BPV}=f(n, p_a, P_s)$ or the air inlet manifold pressure $Y_{BPV}=f(n, p_i, P_s)$, wherein $p_a$ is the ambient air pressure, and $p_i$ is the air inlet manifold pressure.

14. The method according to claim 12, wherein said back pressure valve function is implemented as a look-up table in a memory comprising back pressure valve position values stored as a function of at least engine speed and braking torque.

15. A computer program product, implemented on computer-readable non-transitory storage medium, the computer program product configured for, when run on a computer, executing the method steps according to claim 1.

16. A compression release brake controller in an engine comprising an air inlet system and an exhaust manifold connected to a turbine provided with a variable turbine geometry (VTG) wherein said turbine is further connected to a back pressure valve (BPV) for controlling a pressure drop over said turbine, said controller being configured for:
   determining a desired exhaust manifold gas pressure level on the basis of a measured engine speed and a desired braking torque;
   continuously monitoring a set of control parameters, including at least two of cylinder pressure, exhaust manifold pressure, turbine speed and turbine expansion ratio;
   controlling said BPV and said VTG by said control parameters, to drive a first of the set of the control parameters to a set first maximum level; and
   while maintaining the first of the set of control parameters at the set first maximum level, controlling an EGR valve by said control parameters in a closed loop to allow exhaust gas to recirculate towards the air inlet system while driving a second of the set of control parameters to a set second maximum level.

17. A combustion engine comprising an air inlet system and an exhaust manifold connected to a turbocharger provided with a variable turbine geometry (VTG) turbine, said exhaust manifold further comprising an exhaust gas recirculation (EGR) channel for recirculation of exhaust gas towards the air inlet system, wherein said turbine is further connected to a back pressure valve (BPV) provided in an exhaust channel; said engine further comprising:
   a compression release brake controller according to claim 16.

* * * * *